US008887267B2

(12) United States Patent
Smith et al.

(10) Patent No.: US 8,887,267 B2
(45) Date of Patent: Nov. 11, 2014

(54) PROVIDING INTEGRITY VERIFICATION AND ATTESTATION IN A HIDDEN EXECUTION ENVIRONMENT

(71) Applicant: Intel Corporation, Santa Clara, CA (US)

(72) Inventors: Ned M. Smith, Beaverton, OR (US); Vedvyas Shanbhogue, Portland, OR (US); Arvind Kumar, Beaverton, OR (US); Purushottam Goel, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/782,484

(22) Filed: Mar. 1, 2013

(65) Prior Publication Data

US 2013/0179693 A1 Jul. 11, 2013

Related U.S. Application Data

(63) Continuation of application No. 12/639,616, filed on Dec. 16, 2009, now Pat. No. 8,510,569.

(51) Int. Cl.
| | | |
|---|---|---|
| *G06F 21/00* | (2013.01) | |
| *G06F 21/57* | (2013.01) | |
| *G06F 21/55* | (2013.01) | |
| *G06F 21/44* | (2013.01) | |

(52) U.S. Cl.
CPC .............. *G06F 21/44* (2013.01); *G06F 21/57* (2013.01); *G06F 21/554* (2013.01)
USPC ........................................... 726/17; 713/167

(58) Field of Classification Search
CPC ......... G06F 21/44; G06F 21/30; G06F 21/50; G06F 21/554; G06F 21/57
See application file for complete search history.

(56) References Cited

U.S. PATENT DOCUMENTS

| | | | |
|---|---|---|---|
| 6,990,579 | B1 | 1/2006 | Herbert et al. |
| 7,458,002 | B2 | 11/2008 | Fischer et al. |
| 2004/0003273 | A1 | 1/2004 | Grawrock et al. |
| 2004/0165725 | A1 | 8/2004 | Kumar et al. |
| 2005/0066191 | A1 | 3/2005 | Thibadeau |

(Continued)

FOREIGN PATENT DOCUMENTS

| | | |
|---|---|---|
| CN | 1662869 | 8/2005 |
| CN | 101515316 A | 2/2008 |
| CN | 101533447 | 9/2009 |

OTHER PUBLICATIONS

State Intellectual Property Office of the People's Republic of China, Office Action mailed Mar. 4, 2013 in Chinese application No. 201010610084.2.

(Continued)

*Primary Examiner* — Gilberto Barron, Jr.
*Assistant Examiner* — Devin Almeida
(74) *Attorney, Agent, or Firm* — Trop, Pruner & Hu, P.C.

(57) ABSTRACT

In one embodiment, a processor includes a microcode storage including processor instructions to create and execute a hidden resource manager (HRM) to execute in a hidden environment that is not visible to system software. The processor may further include an extend register to store security information including a measurement of at least one kernel code module of the hidden environment and a status of a verification of the at least one kernel code module. Other embodiments are described and claimed.

20 Claims, 10 Drawing Sheets

(56) References Cited

U.S. PATENT DOCUMENTS

| | | |
|---|---|---|
| 2006/0015749 A1 | 1/2006 | Mittal |
| 2008/0077993 A1 | 3/2008 | Zimmer et al. |
| 2008/0184028 A1 | 7/2008 | Anson et al. |
| 2008/0244292 A1 | 10/2008 | Kumar et al. |
| 2009/0132837 A1 | 5/2009 | Kumar |
| 2009/0172438 A1 | 7/2009 | Kumar |
| 2009/0290712 A1 | 11/2009 | Henry et al. |

OTHER PUBLICATIONS

European Patent Office, Examination Report mailed Apr. 2, 2014 in European Patent Application No. 10842398.9.

International Searching Authority, "Notification of Transmittal of the International Search Report and the Written Opinion of the International Searching Authority," mailed Jul. 1, 2013, in International application No. PCT/US2010/054312.

European Patent Office, Search Report mailed May 22, 2013, in European application No. 10842398.9-1956 / 2513837.

International Searching Authority, "Notification of Transmittal of the International Search Report and the Written Opinion of the International Searching Authority, or the Declaration," in international application No. PCT/US2010/054312.

The State Intellectual Property Office of the People's Republic of China, Office Action mailed Jul. 30, 2013 in Chinese application No. 201010610084.2.

PROVIDING INTEGRITY VERIFICATION AND ATTESTATION IN A HIDDEN EXECUTION ENVIRONMENT

This application is a continuation of U.S. patent application Ser. No. 12/639,616, filed Dec. 16, 2009, the content of which is hereby incorporated by reference.

BACKGROUND

Computer systems are formed with a collection of hardware elements including one or more processors, memory, input/output devices and so forth. In addition, different types of software may be present in a system, including system software such as an operating system (OS), a virtual machine monitor (VMM) or so forth. In addition, application software can be provided to perform specific tasks desired by a user such as word processing, email, games and so forth. To enable communication between software and underlying processor hardware, instructions of the software can be converted into smaller instructions such as micro-instructions (uops) that can be implemented using microcode stored in the processor.

In general, a full range of memory is visible to system software such as an OS or VMM. However, to provide for secure operations and so forth, a hidden partition may be provided in memory that includes code that can run using a resource manager, which can be implemented in processor microcode and which can be hidden from the OS/VMM. However, various security and attestation issues arise in providing such hidden resources, raising complexity.

As one example, when a system is placed in certain low power states, such as a so-called suspended (S3) state in accordance with the Advanced Configuration and Power Interface (ACPI), Rev. 2.0 Standard, Apr. 25, 2003, the system memory is in self-refresh state. However, the processor is powered off and thus there are no protections active on the memory. Hence an adversary may be able to modify the contents of memory when the system is in the S3 state and if the memory is not verified on resume (S0 state), this may lead to code injection attacks on a hidden memory partition of the system memory. While hashing the memory prior to entering S3 and verifying the contents on resuming from S3 into S0 may avoid such code injection attacks, this has drawbacks, including extending the amount of time needed to transition between S0 and S3 due to the additional work to be done to hash and later verify the memory contents.

DETAILED DESCRIPTION

Embodiments may provide for efficient verification of the integrity of a hidden memory partition, which can be used when exiting from a low power state into a normal operation state. Still further, embodiments may be used to provide attestation of a hidden environment such that various software to be executed in the environment can be verified prior to execution. Such attestation may be implemented completely within a processor and without the need for accessing other components via an interconnect, increasing the speed and reducing the complexity and potential for security threats via interaction with the interconnect and other components.

In order to provide memory separation between a host operating system (OS)/virtual machine monitor (VMM) and a hidden partition, a processor may make use of one or more hardware range registers that effectively block host OS/VMM-generated accesses to the hidden memory. Likewise, in order to control accesses from the hidden partition to the host OS/VMM memory, a page table may be present under the hidden partition. To better understand operation in a hidden environment, it is instructive to provide an overview of a platform that provides for such an environment.

Figure 1:
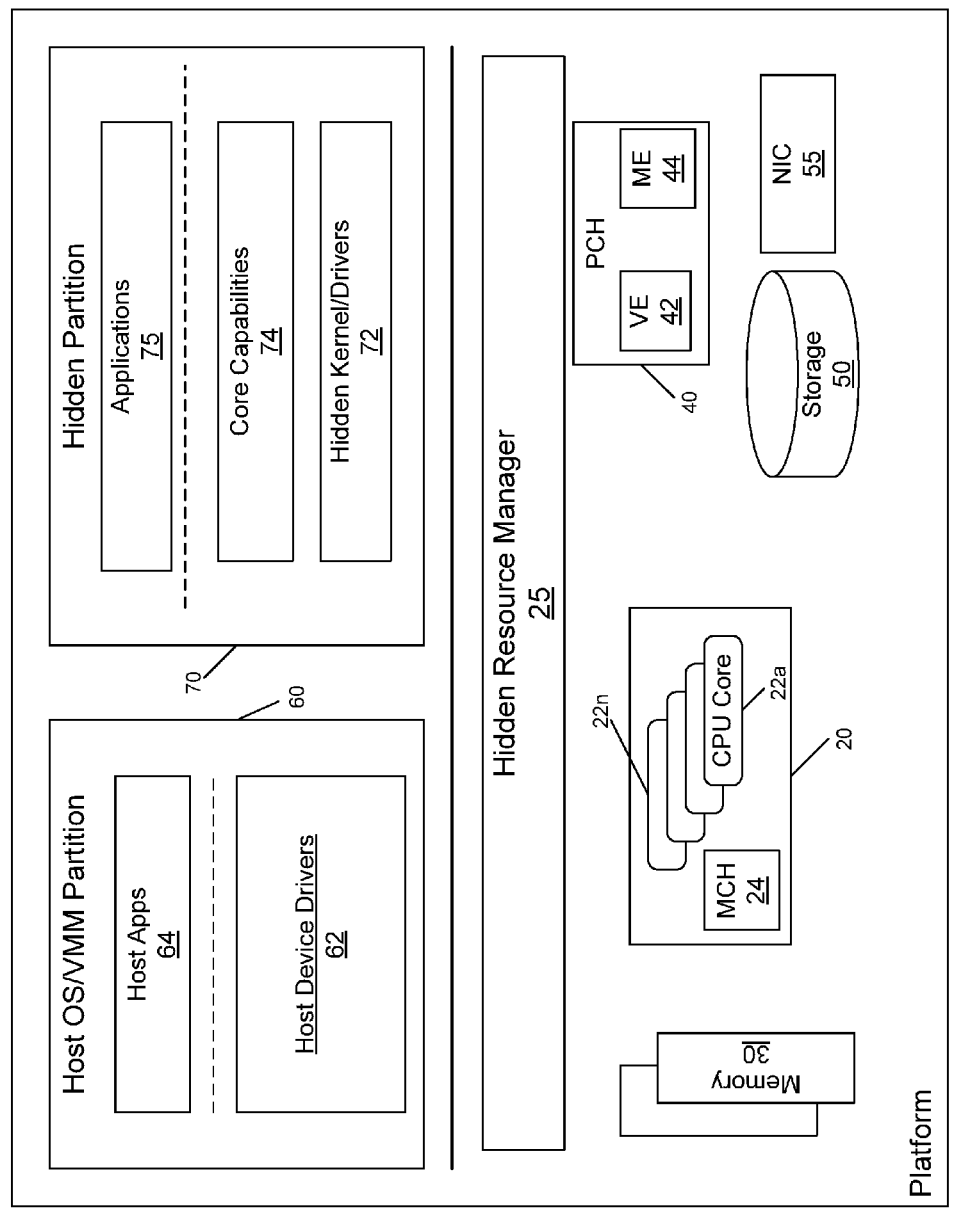
FIG. 1 is a block diagram of a platform in accordance with one embodiment of the present invention.

Referring now to FIG. 1, shown is a block diagram of a platform in accordance with one embodiment of the present invention. As shown in FIG. 1, platform 10 may be any type of computer system such as server computer, desktop computer, laptop computer, netbook computer or so forth. The platform includes various hardware and software to operate together to perform requested operations. As seen, the platform hardware includes a processor 20, which in one embodiment may be a multicore processor including a plurality of processor cores $22_a$-$22_n$. As will be discussed further below, each core 22 may include microcode for execution in a hidden environment, where this environment is hidden from other system software such as an OS or VMM. As further seen, processor 20 includes a memory controller hub (MCH) 24 to communicate with a system memory 30, which in one embodiment may be a dynamic random access memory (DRAM).

Additional hardware of platform 10 may include a peripheral controller hub (PCH) 40 that may include a virtualization engine 42 (VE) and a manageability engine (ME) 44 which may provide control functions for various peripheral devices such as a storage 50, e.g., a mass storage such as a disk drive, optical or other non-volatile storage. In addition, a network interface controller (NIC) 55 may enable communication between platform 10 and other agents of a network such as a wired network, e.g., a local area network (LAN), a wireless network such as a wireless LAN (WLAN), or a wide-range wireless network such as a cellular network. While shown with this particular hardware in the embodiment of FIG. 1, understand the scope of the present invention is not limited in this regard.

As further seen in FIG. 1, various software is also present. Firstly, shown is a hidden resource manager (HRM) 25. As seen, this layer of software may act as an interface between underlying processor hardware and a hidden partition 70. In one embodiment, HRM may be implemented as processor microcode stored in a microcode storage of the processor.

Note that this microcode and storage may be separate from conventional microcode and microcode storage that is used to provide processor instructions for corresponding user-level instructions of an instruction set architecture (ISA). However, in some embodiments, the hidden microcode and the conventional microcode may be stored in different partitions of a single microcode storage.

The resource manager may execute to provide services to code of hidden partition 70. As seen, various code may be present in this hidden partition, which may be stored in a partition of, e.g., system memory 30 that is segmented and hidden from other system software, i.e., the OS and VMM. Hidden partition 70 includes various code, including one or more hidden kernels and drivers 72, which may provide kernel services as well as drivers for interfacing with various devices of the platform. Additional core capabilities code 74 may be present, in addition to one or more applications 75 that may execute in the hidden execution environment. Although the scope of the present invention is not limited in this regard, the hidden execution environment may be for operations such as implemented to follow a formal security model that provide higher integrity than a general-purpose OS. In addition, platform includes conventional software including a host OS/VMM partition 60, which may include various host device drivers 62 and host applications 64. Such code may be stored in another partition of system memory 30. HRM 25 may provide an abstraction of the system hardware to the OS/VMM partition.

Embodiments may provide mechanisms that may be implemented by processor microcode that executes in the hidden environment to reduce the amount of time that needs to be spent in performing S3 to S0 and S0 to S3 transitions. Transitioning a system into S3 causes the processor to be powered off and the memory to be placed into a self-refresh mode. At this time there are no protections on the memory, and various runtime protections are not operational. As such, the memory, including the hidden memory, may be vulnerable to different security threats. Note that states S1 and S2 apply to processor components (e.g., core and uncore only) and do not involve system memory. Additional low power states S4 and S5 cut power to system memory so all contents are lost.

While the following list is not exhaustive, it is to be understood that threats can take many different forms. For example, one such threat may be malicious code injection in which an attacker can modify/replace a memory image during S3 power state transitions. Other threats exploit hash algorithms, in which an attacker can exploit weaknesses in cryptographic hash algorithms to find an attack memory page that has the hash signature of a valid page, and then the attack page is injected into memory. A break once run everywhere (BORE) attack is one in which an attacker that has obtained an attack page can inject the attack page on a large number of similarly configured systems. A replay attack may occur where an attacker archives all the memory pages and integrity check values and then replaces the current memory pages and integrity values. A page swap attack occurs when an attacker may swap pages that have the same cipher message authentication code (CMAC) values.

Certain threats can be addressed by having the HRM measure (e.g., hash and verify) the memory image in self-refresh before allowing it to execute. In one embodiment, the approach does a page-by-page integrity check whose values are recorded in an integrity check value (ICV) array. The hash is performed by the HRM microcode. In one embodiment, each entry of the ICV array contains the following information: an integrity check value, which may be a secure hash algorithm (SHA) hash of the page or an Advanced Encryption Standard-Cipher-based Message Authentication Code (AES-CMAC) operation in accordance with the Network Working Group Request for Comments (RFC) 4493, June 2006; an ICV valid indicator, which may be true/false to indicate whether the page has been modified since the last ICV calculation was performed; and a direct memory access (DMA) page indicator, which can be true/false to indicate whether the page can be accessed by devices using DMA.

In one embodiment, the HRM can use a background task to periodically hash the hidden pages. Prior to each transition to the hidden environment, the background task can be invoked to hash a fixed set of pages in memory. For example, if the hidden image is 64 MB in size, there are 16384 pages to integrity protect. The background task may run through the 16K pages in a round robin manner and perform the hash of 16 pages in each run. Thus the background task will need to be invoked 1K times to perform the hash of all 16K pages allocated to a hidden execution environment (HEE). The time taken to hash the pages is attributed to the HEE and is subtracted from execution credit.

The ICV calculation can be according to different hash algorithms. For example instead of a SHA1 hash, a stronger hash algorithm such as a SHA2 operation can be used to address hash algorithm exploits. However, there can be a performance penalty and memory overhead cost associated with use of SHA2 algorithms. SHA256 requires approximately 20 cycles/byte and SHA512 about 12 cycles/byte. SHA2 algorithms also produce a message digest that is typically quite large. SHA256 has a 256-bit (32 bytes) message digest (MD) and SHA512 has a 64 byte MD. This overhead is multiplied by the number of pages in memory (16-64 MB) which is a considerable added overhead.

Figure 2:
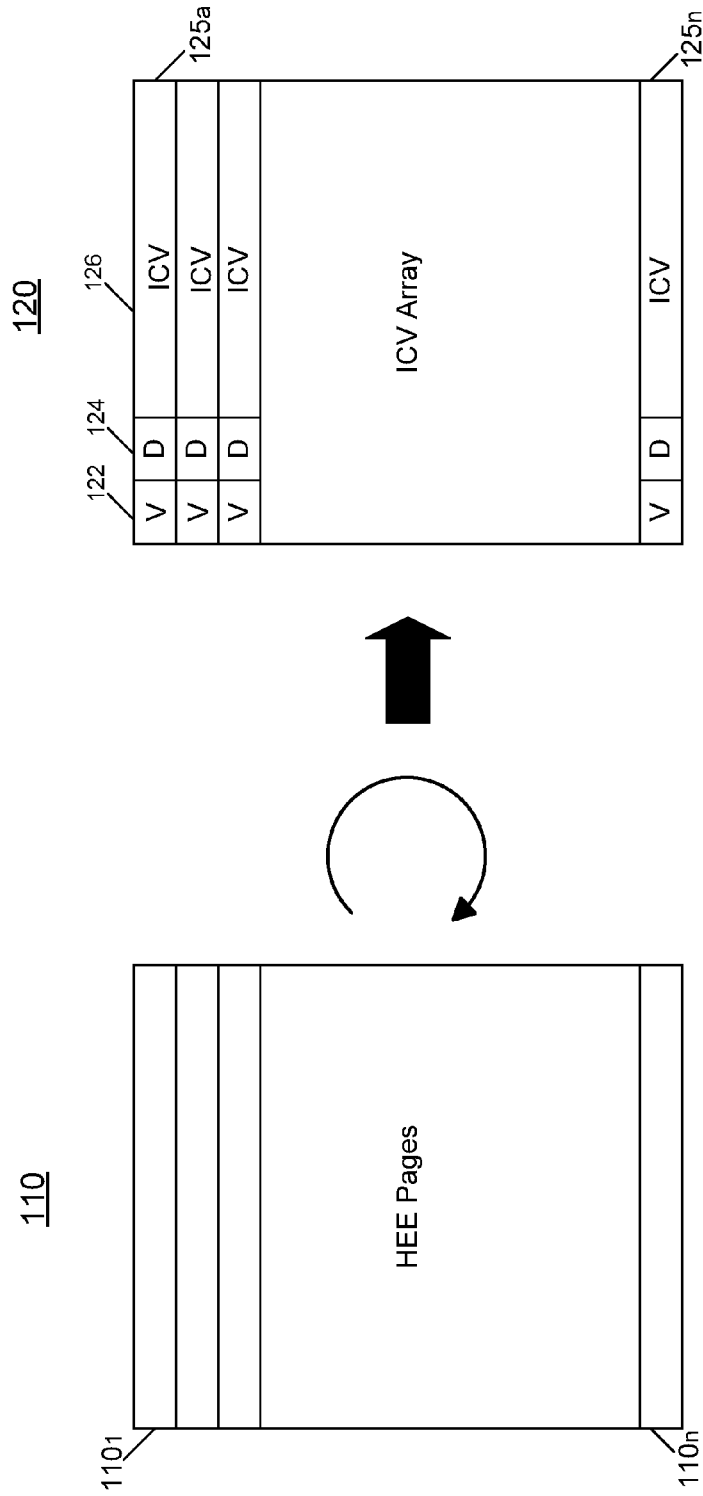
FIG. 2 is a block diagram of an integrity check value (ICV) array in accordance with one embodiment of the present invention.

Thus in many embodiments an alternative to SHA2 such as an AES-CMAC operation may be used, which is much faster than a SHA algorithm. Also, a CMAC may be used instead of a SHA2 function as it has second pre-image resistance Referring now to FIG. 2, shown is a block diagram of an ICV array in accordance with one embodiment of the present invention. As shown in FIG. 2, a hidden execution environment may store its information (i.e., code and data) in a hidden partition of memory. Specifically as shown in FIG. 2, a plurality of pages $110_1$-$110_n$ of a memory 110 may be partitioned for the hidden execution environment. During operation in the background of the hidden environment, the HRM may perform hashes of each of these pages and store the hash values in an ICV array 120. As seen, ICV array 120 may include a plurality of entries $125_a$-$125_n$, each corresponding to a page of the hidden partition 110. Each such entry includes an ICV field 126 to store a CMAC or hash value, along with a valid indicator 122 and a DMA indicator 124, as described above. In one embodiment, ICV array 120 may also be stored in a portion of hidden partition $110_1$ although implementations may store this ICV array in other locations. A hash of ICV array 120 may also be computed and encrypted using an encryption key known only to the HRM. In this way, only the HRM can modify the ICV array.

On a S0 to S3 transition, the HRM may generate ICV values for the hidden memory pages. Thus on a S0 to S3 transition the HRM constructs the ICV array dynamically by computing CMAC values for each memory page, along with the indicators described above, in one embodiment. The ICV array can be stored in an unused memory page. Thereafter, the hidden memory may be protected using integrity calculations and protection in accordance with an embodiment of the present invention.

Figure 3:
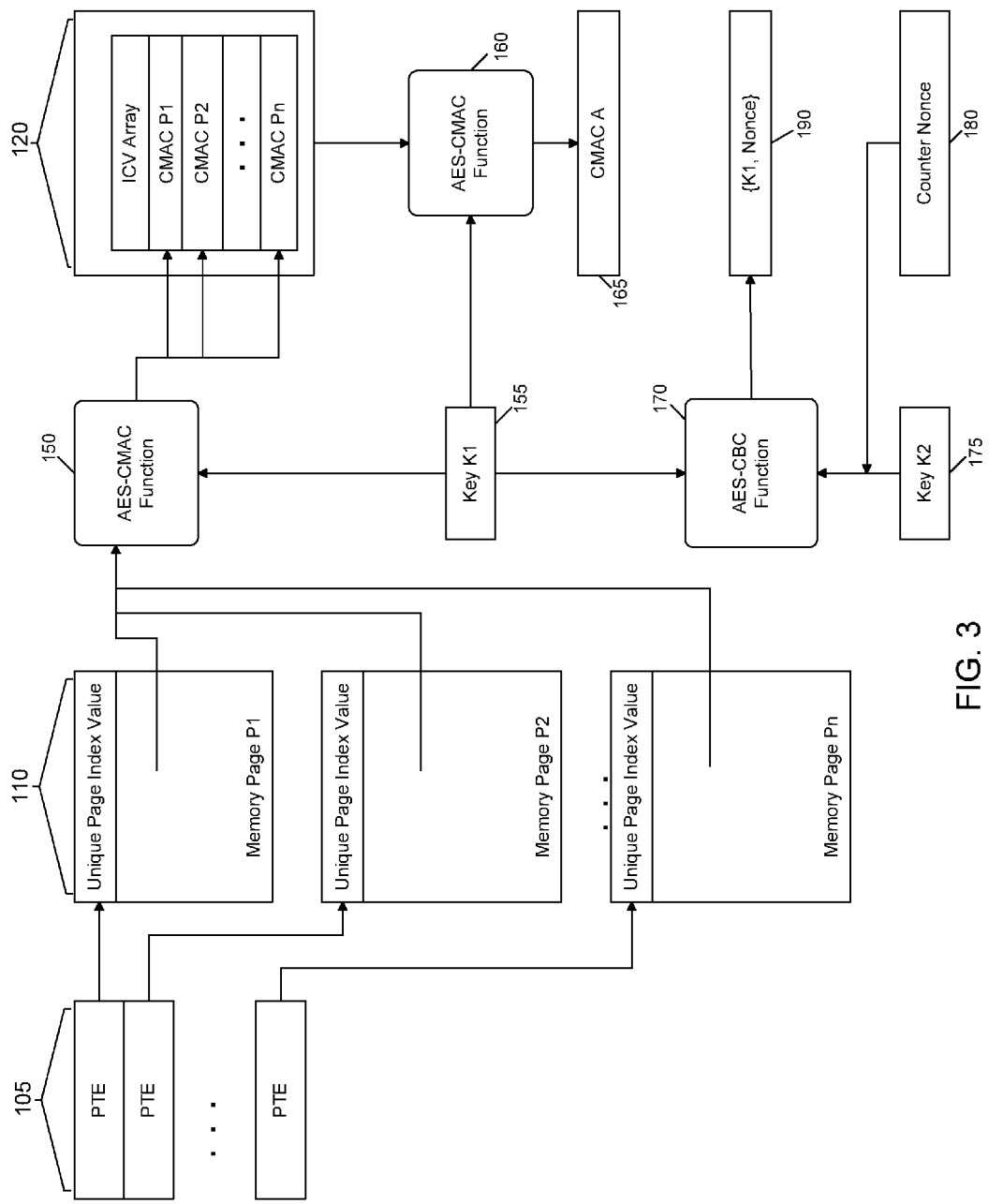
FIG. 3 is a block diagram of an overview of hidden memory integrity calculation and protection in accordance with an embodiment of the present invention.

Referring now to FIG. 3, shown is a block diagram of an overview of hidden memory integrity calculation and protection in accordance with an embodiment of the present invention. As shown in FIG. 3, a hidden partition 110 may include a plurality of memory pages P1-Pn, each of which may be accessed using information present in a page table entry 105. Such page table entries may be present within a processor, which may cache such entries in a translation lookaside buffer (TLB) or other structure, or the entries may be present within the hidden partition itself. Note that page table entries for the hidden partition may be stored in a separate page table.

To perform an integrity calculation, each memory page may be provided to an AES-CMAC function 150, which in one embodiment may be implemented using an accelerator or other specialized hardware present in a processor core, uncore, integrated input/output controller, peripheral controller, memory controller, or security co-processor. By using a private key K1 that is unique to every platform as part of a CMAC computation, a CMAC value from another platform cannot be used to attack the target platform since the attacker cannot guess K1 easily for each platform.

In one embodiment, this key may be 128 bits and may be unique to each platform. In one embodiment, the AES-CMAC computation may use an AES accelerator contained in a core that can perform user-level ISA instructions to implement an AES algorithm. With the AES accelerator the AES-CMAC can function at about 3.5 cycles/byte in one embodiment, providing an efficient and secure method for page integrity protection. The resulting CMAC value for each page may be stored in an ICV array 120. In one embodiment, the memory overhead per page is 64-bits per CMAC. The high-order bits are selected from a 128-bit CMAC resulting from the 128-bit K1 value. In addition, an integrity calculation on the overall ICV array 120 may similarly be performed using the same key K1 using function 160, which thus stores an array CMAC value (CMACA) in a storage 165. In one embodiment, this CMACA value may be 64 bits.

To identify an instantiation for which these integrity values were calculated, an AES-cipher block chaining (CBC) encryption function 170 in accordance with the Network Working Group Request for Comments 3602 (September 2003) may operate to generate an encrypted blob 190 using a second private key K2, stored in a storage 175, that operates to perform an encryption on the key value K1 and a value of a counter C1, stored in a counter 180. In one embodiment, K2 is derived from a HRM storage key (a symmetric key known only to the HRM). In turn, the HRM storage key can be obtained from a set of fuses in the processor or in a chipset. In various embodiments, the counter may be a monotonic counter.

In different implementations, the monotonic counter resource can be implemented using several techniques. As examples, the counter can be realized by accessing a TPM or ME. In this example, the HRM may take ownership of the TPM to ensure access to counter resources or the HRM may access a persistent register, e.g., present in the processor. As another example, the HRM may access a hidden storage area (e.g., a flash or other non-volatile memory) by establishing a trusted relationship (e.g., performing a key exchange) with a ME. As yet another example, the HRM may access a storage device such as hard disk drive or a solid state drive (HDD/SSD), e.g., by establishing a trusted relationship (e.g., performing key exchange) with the storage device.

The resulting blob 190 may be stored and then later accessed to determine whether the hidden partition's memory remains intact after a transition back to an operating state. C1 is incremented to a resume counter value C2 following its inclusion in the blob. Thereafter, C2 may be written to a persistent memory, e.g., using a read-increment-write atomic operation, to ensure a replay attack can be detected. In other embodiments, the increment may occur after the resume from the S3 state.

Note that in some embodiments, a page swap attack can be addressed by including a page index value taken from page metadata in the CMAC. Page index values are determined by the HRM which relies on hardware protections to thwart attackers. Program bugs in the HRM could result in duplicate page index values being included on more than one page CMAC. An alternative technique may use a second monotonic counter as a more reliable unique identifier.

Figure 4:
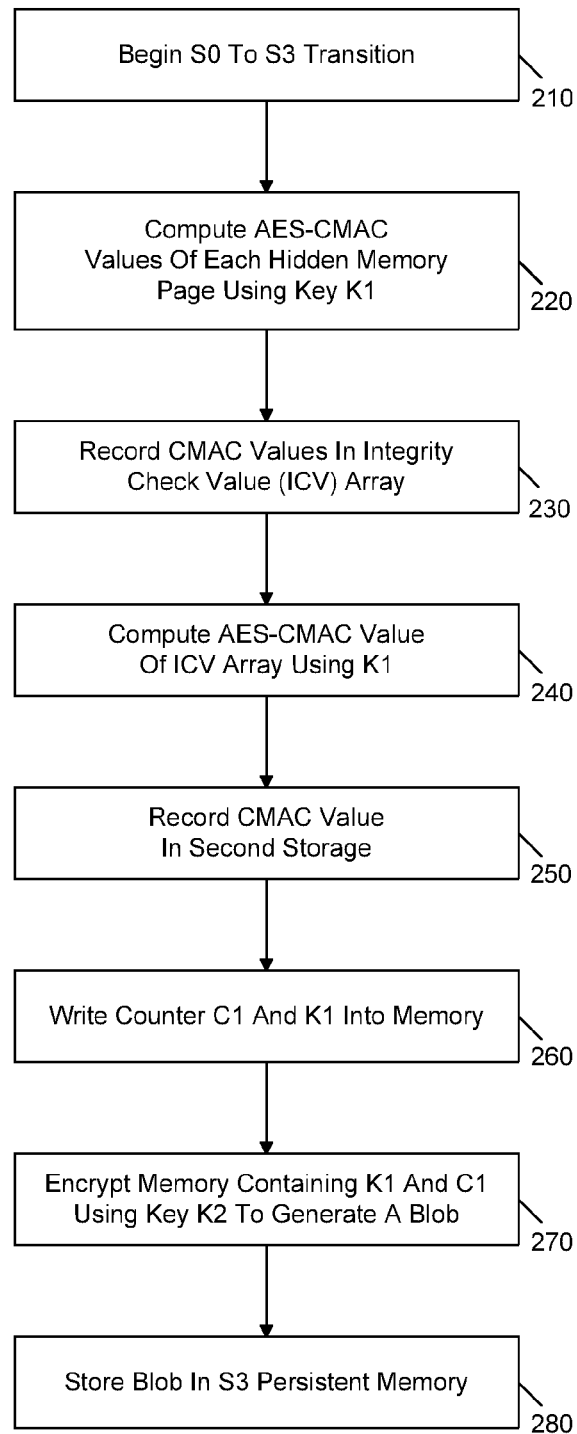
FIG. 4 is a flow diagram of a method for transition into a low power state in accordance with an embodiment of the present invention.

Referring now to FIG. 4, shown is a flow diagram of a method for transition into a low power state in accordance with an embodiment of the present invention. As shown in FIG. 4, method 200 may begin on receiving an instruction to transition to a low power state (e.g., a transition from S0 to S3) (block 210). Using microcode of the hidden environment, AES-CMAC values may be computed for each page of the hidden memory using a private key K1 (block 220). These CMAC values may be stored in the ICV array (block 230). On completion of all of these calculations, an AES-CMAC value can be computed for the entire array, using the same key K1 (block 240). This CMAC value may be stored in another storage (block 250).

Referring still to FIG. 4, then the monotonic counter value C1 and K1 may be written into a memory (block 260). As an example, these values may be stored in a temporary storage location such as a cache location or within the hidden partition. This memory may then be encrypted using private key K2 to thus generate an encrypted blob (block 270). This blob may then be stored in an S3 persistent memory (block 280). As an example, the blob may be stored in a predetermined region of the hidden partition that remains in self-refresh during the S3 mode. While shown with this particular implementation in the embodiment of FIG. 4, the scope of the present invention is not limited in this regard.

Figure 5:
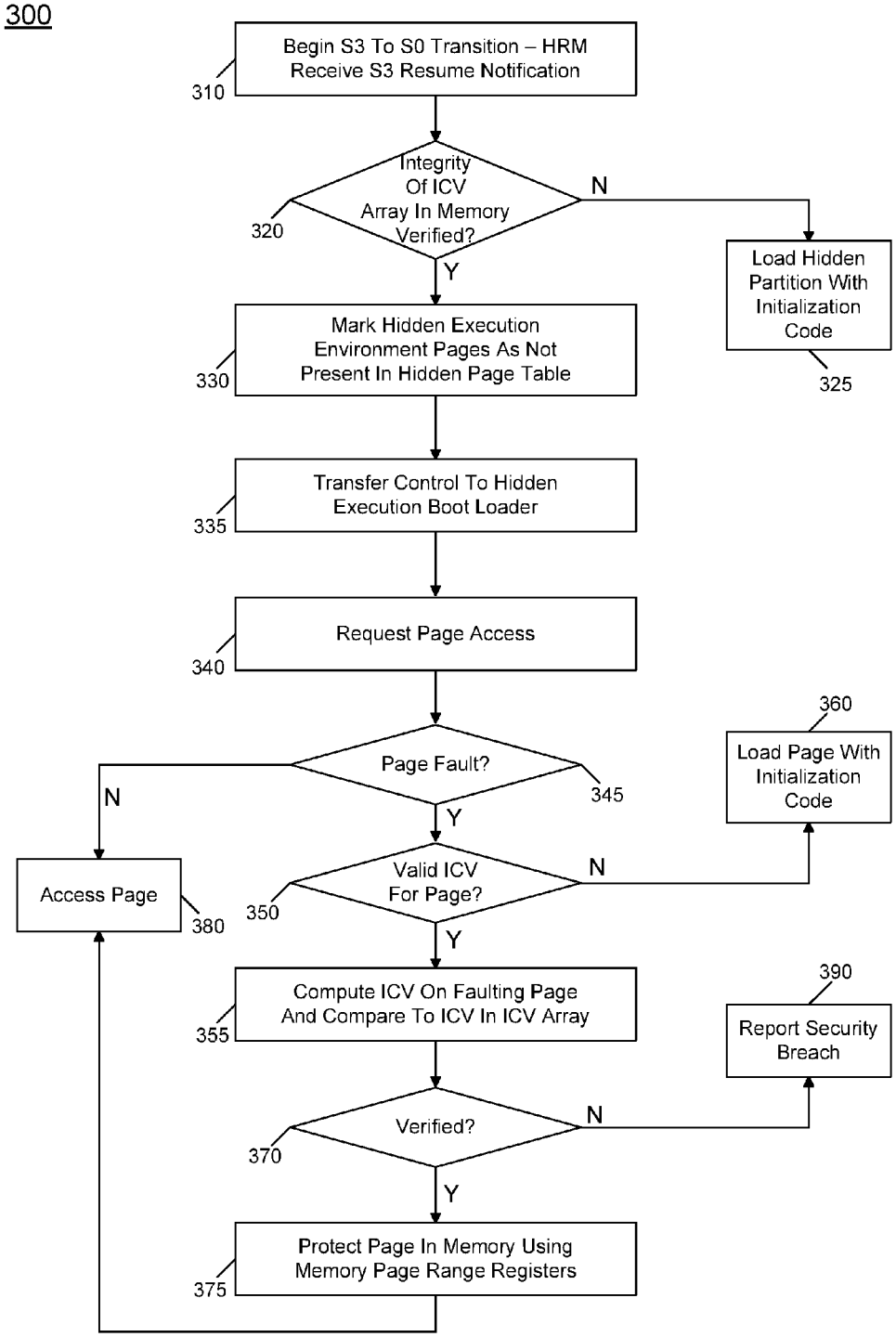
FIG. 5 is a flow diagram of a method for resuming execution in a normal power mode from a low power mode.

Referring now to FIG. 5, shown is a flow diagram of a method for resuming execution in a normal power mode from the low power mode. As seen, method 300 may begin by receiving in the HRM a resume notification (block 310). For a S3 resume, the HRM may receive a notification to resume the hidden image, e.g., via a basic input/output system (BIOS) (block 310). The HRM creates a container for the hidden environment and then determines if there is a valid ICV array in hidden memory. If so, the validity of the ICV array can be determined by verifying the CMAC of the ICV array (CMACA) and the CMAC for each page (diamond 320). If ICV array integrity is not intact, the HRM continues the hidden initialization as a normal reset path, i.e., the image in memory is discarded and a fresh load code load is performed, e.g., from a non-volatile storage (block 325).

If the integrity of the ICV array is not compromised, the HRM marks all HEE pages as not present in hidden page tables (block 330) and transfers control to a hidden boot loader entry point (block 335). As the boot loader starts executing, the code and data page accesses (block 340) generate page table faults into the HRM (diamond 345). If there is a valid ICV for the page in the ICV array (diamond 350), the HRM computes the ICV on the faulting page and matches it against the ICV in the ICV array to verify the integrity of the page (block 355). If verified (diamond 370), the page is then mapped into the hidden page table as a read-only page (to track changes to the page) (block 375). Thereafter, access to the page may be allowed (block 380).

Figure 6:
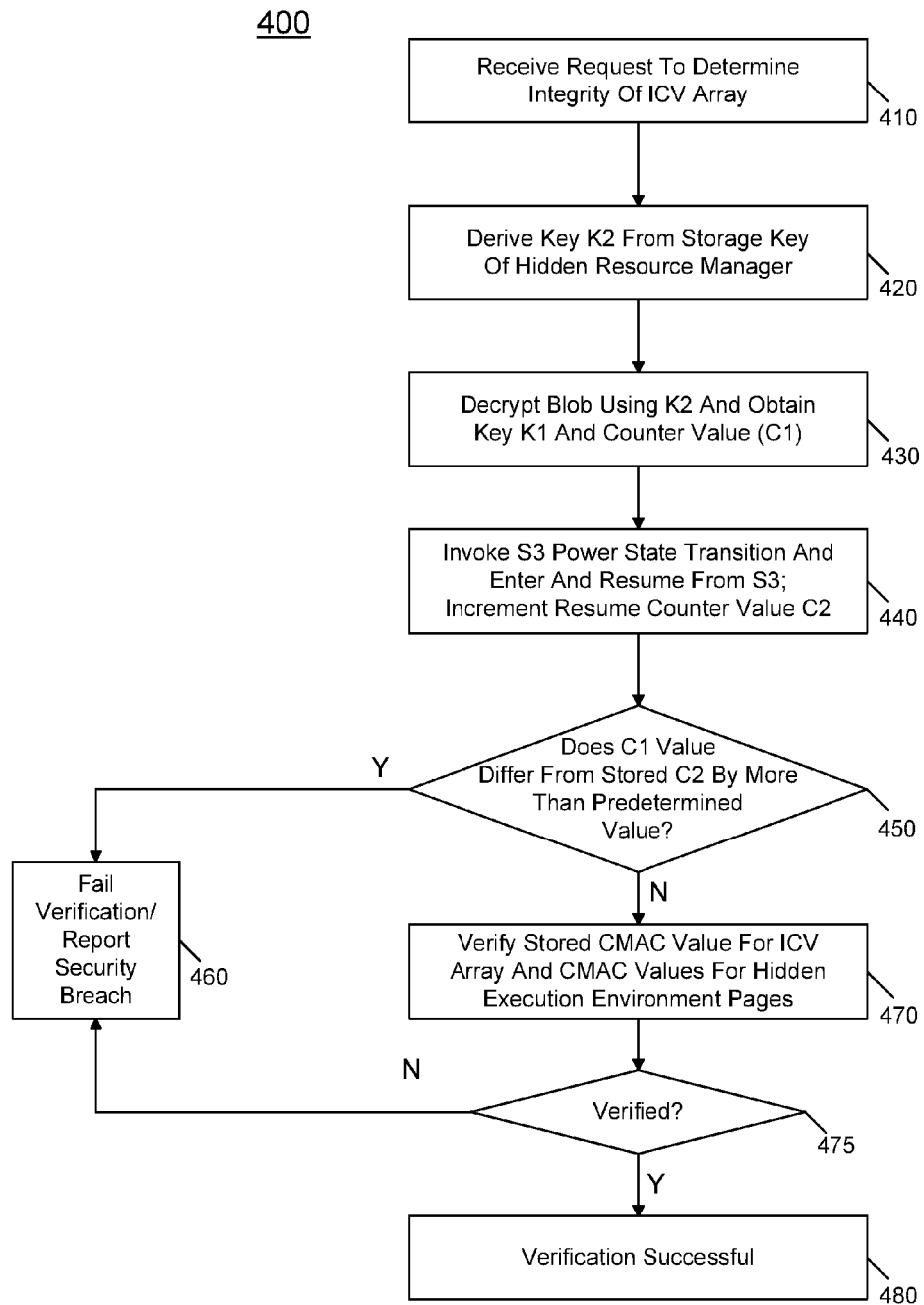
FIG. 6 is a flow diagram of a verification method in accordance with an embodiment of the present invention.

Still referring to FIG. 5, if at diamond 350 it is determined that there is not a valid ICV for the page (e.g., as indicated by the valid indicator) for the corresponding ICV array entry, control passes to block 360, where the page may be loaded with initialization code. Further, as seen, if a valid ICV entry exists, but the computed ICV does not match the corresponding stored ICV value, verification at diamond 370 fails, and a security breach may be reported (block 390). While shown with this particular implementation in the embodiment of FIG. 5, understand the scope of the present invention is not limited in this regard. For example, in some implementations, validation of memory pages accessible to a guest OS (e.g., of a non-hidden memory partition of system memory) may also be performed, where the HRM enables such validation Referring now to FIG. 6, shown is a flow diagram of a verification method in accordance with an embodiment of the present invention. As shown in FIG. 6, method 400 may be implemented by the HRM when verifying an ICV array when resuming from the S3 state. As seen, method 400 may begin by receiving a request to determine the ICV integrity (block 410). Accordingly, the HRM may derive the encryption key K2 from a storage key of the HRM (block 420) and accordingly the decrypt the blob using K2 to obtain key K1 and counter value C1 (block 430). Note also that a power state transition may be invoked either prior to or at this time to resume from S3 and to increment a resume counter value C2, which may be obtained from the persistent storage on the resume (block 440).

At diamond 450 the HRM may determine whether the C1 value differs from the C2 value by more than a predetermined threshold (e.g., 1). If so, verification fails and a security breach may be reported (block 460). If the comparison is as expected, control passes to block 470, where the CMAC value for the ICV array and the CMAC values for each of the hidden execution environment pages may be verified (block 470). If the computed values match the stored values, verification may be successful as determined at diamond 475 and a report of successful verification may be made (block 480). Otherwise, verification fails and control passes to block 460.

By performing hashing of memory pages based on AES-CMAC and an AES-CMAC of the array of CMAC values (CMACA), embodiments may realize a more efficient technique for preventing second pre-image attacks. Additionally, use of a monotonic counter value included with encryption of the CMACA value can prevent an attacker from replacing all memory pages with pages from a previous power state transition. Also, by including a page index value in the page CMAC calculation, malicious replacement of identical pages occurring at different address locations that have the same CMAC value can be prevented.

Embodiments may further enable a hidden manageability environment instantiated using microcode of a microprocessor to attest to that environment to external entities, while being sensitive to a user's privacy goals. In addition, integrity measurements of the environment can be recorded by microcode so that they can be later used and verified by a remote or external entity.

To realize such attestation activity, microcode can create a root-of-trust in which the functions of attestation are protected from external threats. An extend register of the processor may be used to store integrity measurements. Then a private key (e.g., a so-called EPID) can be used to digitally sign the contents of the extend register. In turn, a corresponding public key can cryptographically verify the signature of the EPID private key. In some embodiments, an OwnerID value can also be provided by the entity responsible for determining the platform's privacy and security policy.

An asymmetric code signing key may be used to verify the integrity of firmware that is loaded into the hidden environment at execution/startup. In turn, an integrity manifest may contain a white list of acceptable integrity measurements. This manifest may protect a launch control policy that indicates all applications that may be launched into the hidden environment.

In general, two phases of operation to boot into a secure hidden environment may occur: 1) a launch phase; and 2) an attestation phase. In the launch phase firmware is loaded into memory pages that are hidden from main memory by the HRM. The integrity manifest is first verified using an asymmetric code signing key. The module to be loaded is then verified using a white list (e.g., hash values) contained in the manifest.

Code measurements are recorded in the extend register that is accessible only by the HRM so that its value cannot be updated or reset by untrusted code. As will be described below, in one embodiment the first object to be verified is a transient kernel of the hidden environment, referred to as Kernel-0, a boot loader, which is used to launch a persistent kernel (Kernel-1) of the hidden environment. Kernel-0 receives the code signing key from the HRM and performs code integrity measurements and verifications for Kernel-1. Measurements are given to the HRM to be stored in the extend register. Then Kernel-1 verifies application code integrity using the launch control policy supplied by Kernel-0. Integrity measurements of the application(s) may be recorded in a log file called a launch history. Details of the attestation phase are described further below.

Figure 7:
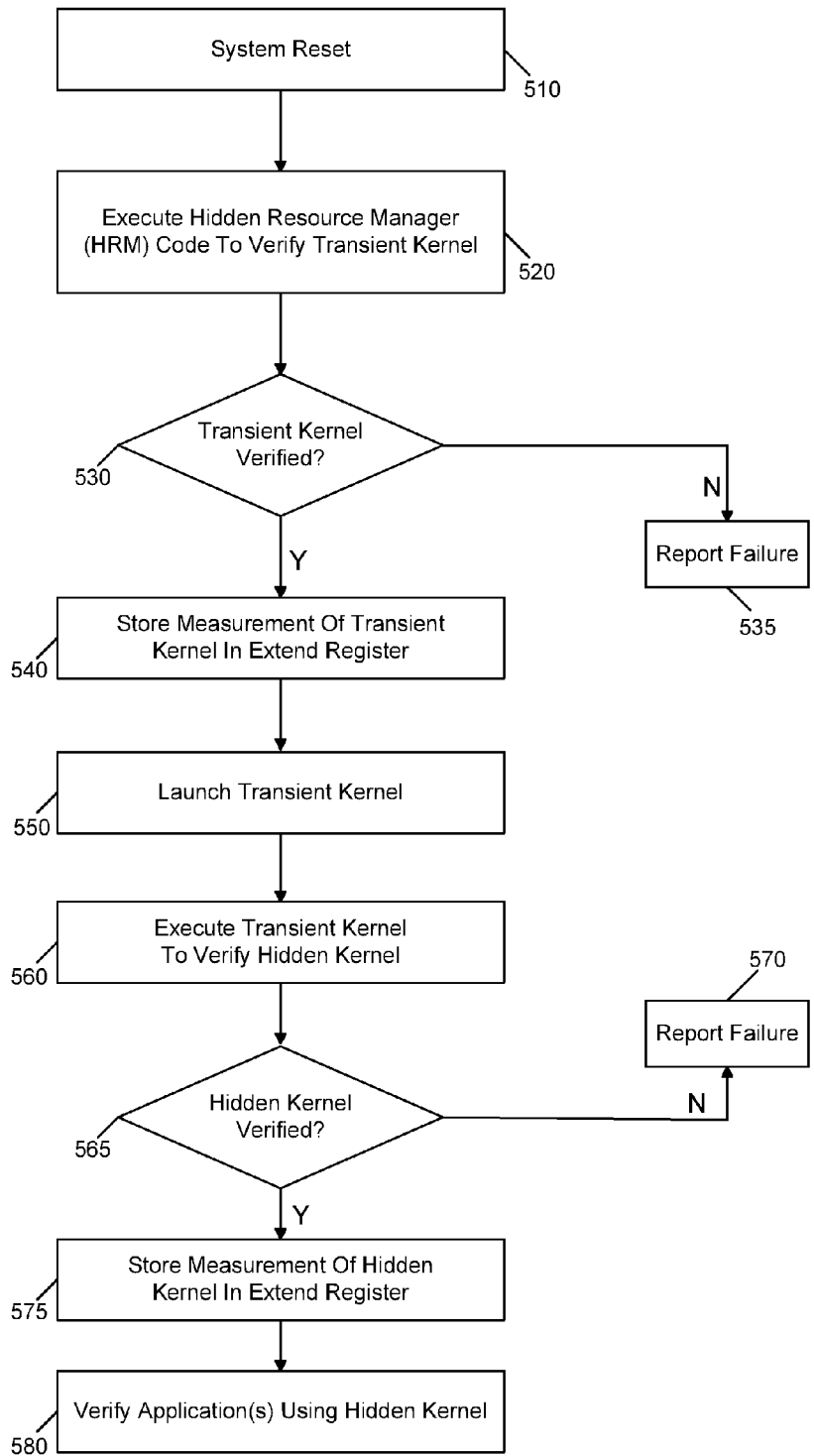
FIG. 7 is a flow diagram of a high level launch method in accordance with one embodiment of the present invention.

Referring now to FIG. 7, shown is a flow chart of a high level launch method in accordance with one embodiment of the present invention. As seen in FIG. 7, method 500 may begin on a system reset (block 510). The HRM code may be executed to verify a transient kernel (block 520). If the transient kernel is verified (diamond 530), control passes to block 540, where a measurement of the transient kernel may be stored in an extend register of the processor (block 540). Otherwise, if verification fails, and the failure may be reported (block 535).

As seen, when verification indicates a valid transient kernel, the transient kernel may be launched (block 550) and executed to verify a hidden kernel (block 560). This hidden kernel may be a persistent kernel for the hidden execution environment. Accordingly, at diamond 565 it may be determined whether the hidden kernel is verified. If so, a measurement of the hidden kernel may be stored in the extend register (block 575), and one or more applications to be executed may be verified using the hidden kernel (block 580). Otherwise, if the hidden kernel is not verified, control passes to block 570, where a failure may be reported. While shown with this particular in the embodiment of FIG. 7, the scope of the present invention is not limited in this regard.

Figure 8:
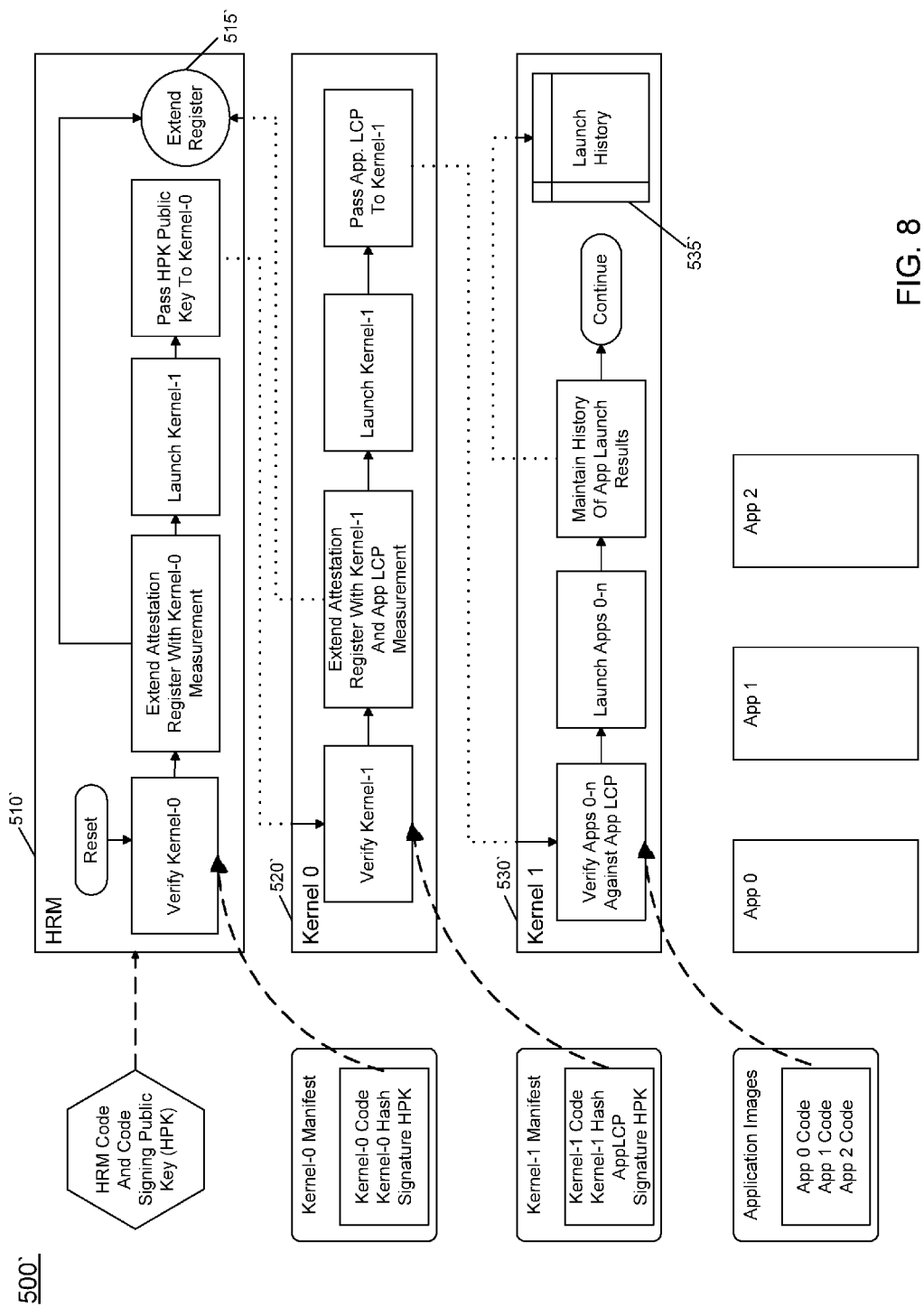
FIG. 8 is a flow diagram of launch operations in accordance with one embodiment of the present invention.

Launch of an application depends on successful launch of each preceding layer down to the HRM, details of which are shown in FIG. 8, which describes a flow 500' of launch operations in accordance with one embodiment of the present invention. As seen, the HRM layer 510' is launched implicitly as part of a Patch-at-Reset mechanism where microcode (and therefore the HRM) is executed. HRM code itself is signed as part of manufacturing. Included in the code image is a code signing key (HPK) that is a manufacturer-issued Rivest Shamir Adelman (RSA) 2048 or larger public key. The HEE Kernel-0 code is loaded by the HRM after reset. Kernel-0 and Kernel-1 images can be located in a non-volatile storage. The images include executable code and a signed manifest containing an integrity hash of the code.

When the HRM loads the Kernel-0 code, it computes a hash (e.g., an AES-CMAC hash) of Kernel-0 code that is compared to the hash value in the manifest. The manifest signature is verified using the HPK code-signing key. If Kernel-0 image integrity is verified, an extend register 515', which may be within a processor, may be updated with the hash value and a flag indicating successful verification (e.g., K0_SUCCESS_BIT=TRUE). Otherwise, the register is updated to indicate failed verification (e.g., K0_SUCCESS_BIT=FALSE).

The Kernel-0 layer 520' may be initiated when the HRM launches Kernel-0 and passes the HPK public key to Kernel-0 only if the flag bit is set (e.g., K0_SUCCESS_BIT=TRUE). Otherwise, the HRM disallows Kernel-0 or Kernel-1 use of the extend register. In one embodiment, Kernel-0 is a transient kernel whose purpose is to launch Kernel-1. Kernel-0 loads a Kernel-1 manifest that includes the Kernel-1 code, a hash of the code, an application launch control policy (AppLCP) that contains a whitelist of acceptable-to-run applications on Kernel-1, and a signature of the HPK. The AppLCP is hashed and extended into extend register 515'. The AppLCP format may include version information that is included in the hash that is extended in the extend register. When Kernel-0 loads the Kernel-1 code, it computes a hash (e.g., AES-CMAC hash) of the Kernel-1 code that is compared to the hash value in the Kernel-1 manifest. The manifest signature is verified using the HPK code-signing key. In one embodiment, all of the Kernel-1 core services and shared libraries are included in the Kernel-1 integrity measurement.

If Kernel-1 image integrity is verified, extend register 515' is updated with the hash value and a flag indicating successful verification (e.g., K1_SUCCESS_BIT=TRUE). Otherwise, it is updated with the flag set to indicate failed verification (i.e., K1_SUCCESS_BIT=FALSE). Kernel-1 computes the AppLCP integrity hash. The hash is given to extend register 515' for update. At this time, the Kernel-1 layer 530' is launched. The AppLCP is passed to Kernel-1 as part of the launch. Kernel-1 loads applications securely by computing an integrity hash for each application to be launched. A policy, separate from the AppLCP, determines which applications are to be loaded. The application integrity check is successful if the Kernel-1 computed hash (AES-CMAC) matches the hash value contained in the AppLCP. A history of application launch results may be recorded in a launch history 535'. At this time the hidden environment is ready for execution.

In the attestation phase, a verifier may initiate a request to obtain proof of environment integrity. The verifier supplies a nonce (e.g., Nonce-1) to Kernel-1, which ensures the attestation result is fresh (i.e., is not replayed from a previous request). Kernel-1 may then construct a hash of the launch history that is passed to the HRM with Nonce-1 for processing.

The HRM incorporates the launch history hash, nonce, extend register and an OwnerID (described below) into a message that is then digitally signed by the private key. The signed attestation record is returned to Kernel-1, and is then forwarded to the original verifier. The verifier checks the EPID signature using a public copy of the private key that it received previously. The verifier applies a policy that interprets the attestation record designed to gauge risk associated with interactions with the hidden environment.

Thus in various embodiments, attestation may be provided entirely in the processor without the need for discrete attestation controllers separate from microprocessor cores. This avoids the need to trust bus architectures and interconnects joining a core with an attestation controller. Still further, embodiments can combine attestation with a hidden environment as the on-chip processor resource can instantiate a hidden manageability environment.

That is, attestation is integrated with the hidden environment in microcode which runs on the processor core(s). Microcode has a root-of-trust similar to processor microcode, it can be trusted to manage EPID, extend register and a code signing key properly. Signing the attestation received using EPID allows the verifier to know that the attestation record is believable because it was constructed by a given manufacturer's provided hardware. In one embodiment, in which a user-generated private key (e.g., an OwnerID) is used, inclusion of the OwnerID in the attestation record allows the owner of the platform to control privacy attributes by determining how unique or non-unique the Owner ID should be.

Figure 9:
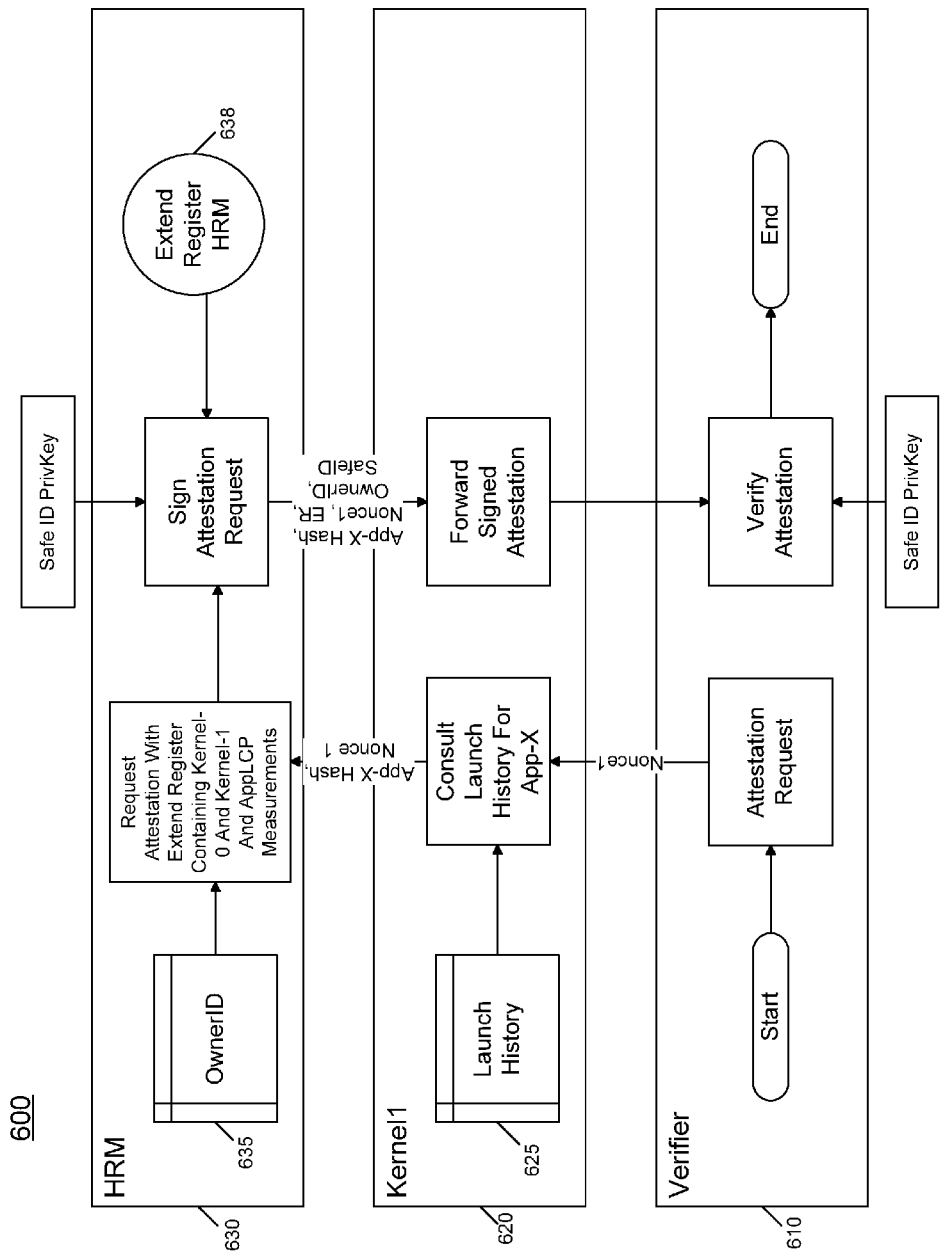
FIG. 9 is a flow diagram of an attestation method in accordance with one embodiment of the present invention.

Attestation of the HEE environment begins with a verifier's attestation request message. A verifier is any environment that has the ability to interact with Kernel-1. Referring now to FIG. 9, shown is a flow diagram of an attestation method 600 in accordance with one embodiment of the present invention. As shown in FIG. 9, a verifier 610 computes a nonce (Noncel) that is unique to the transaction in which attestation is meaningful. The transaction could be long lived (spanning a few years) such as a certificate enrollment process or could be short lived (spanning a few seconds) such as a hypertext transfer protocol (HTTP) session servicing a web page. The verifier is in full control over how Noncel is constructed. Noncel may prevent replay attacks on the transaction where attestation is obtained. Verifier 610 supplies Noncel to Kernel-1 620 as part of the attestation request, which specifies which applications are to be included in the attestation.

Kernel-1 queries the launch history 625 to obtain integrity value and launch state for a given application (e.g., App-X). This information is then forwarded to a HRM 630, along with Noncel. The HRM constructs an attestation record including the information passed in by Kernel-1 and a private key, such as an OwnerID supplied as part of a hidden deployment into the customer's environment. As seen, the OwnerID 635 may be stored in a non-volatile storage associated with the HRM, either internal or external to the processor. When the platform is first loaded into an environment it is possible for the OwnerID to be formed which allows the owner of the platform to establish their own identity for the hardware as opposed to an identity defined by the manufacturer. As such, the owner of the hardware can determine how to name the platform and decide how much or how little uniqueness is desired. Thus based on privacy policies for an organization, this OwnerID may disclose a determined amount of personally identifiable information. The OwnerID is encrypted using the HRM wrapping key (HWK) which is derived from fuses, e.g., in the uncore. The wrapped OwnerID can then be stored in a non-volatile storage along with Kernel-0, Kernel-1, applications, manifests and application data. Information from an extend register 638, which may be a machine specific register (MSR) contained, e.g., in the uncore, including integrity measurements of Kernel-1 and Kernel-0 as well as a hash of the AppLCP is provided with the attestation record, which is signed using the EPID private key.

The signed result is forwarded to verifier 610, where the EPID signature is verified using the EPID public key. The attestation record Noncel is compared to the original to detect replay attacks. The customer-supplied OwnerID is checked to determine if this is a platform owned by the verifier. A published whitelist of applications, Kernel-1, and Kernel-0 images can be consulted to verify that App-X is executing in the intended environment. As one example, the OwnerID(s) assigned to platforms that are deployed into a customer's environment cache archived in a directory service where they can be queried by verification agents that are generally deployed within a network or enterprise. The verifier also may access a whitelist of owner approved kernels, applications and configurations, also archived in the directory service.

Figure 10:
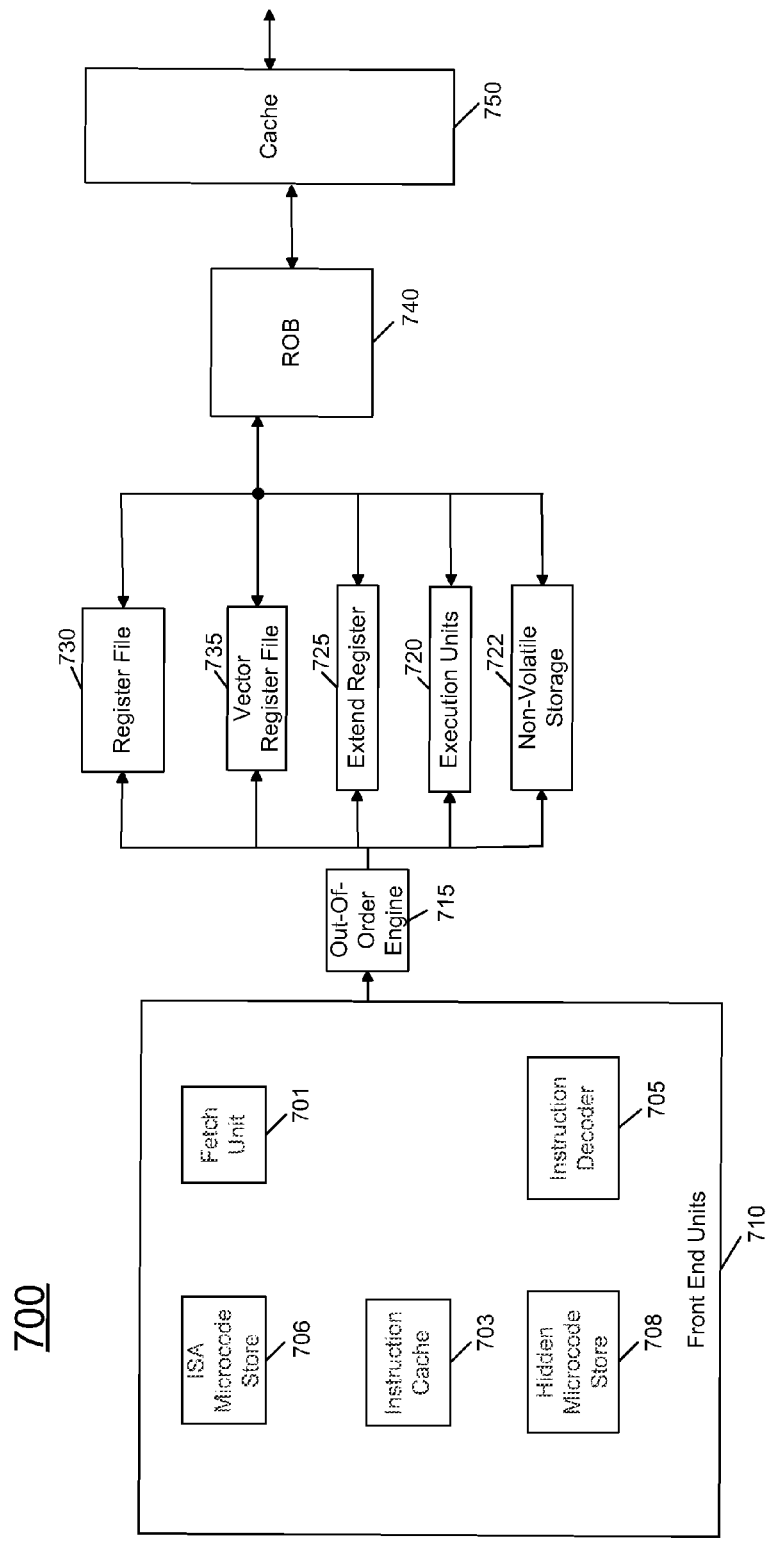
FIG. 10 is a block diagram of a processor in accordance with one embodiment of the present invention.

Referring now to FIG. 10, shown is a block diagram of a processor in accordance with one embodiment of the present invention. As shown in FIG. 10, processor 700 may be a multi-stage pipelined out-of-order processor. Processor 700 is shown with a relatively simplified view in FIG. 10 to illustrate various features used for a hidden execution environment in accordance with an embodiment of the present invention.

As shown in FIG. 10, processor 700 includes front end units 710, which may be used to fetch macro-instructions to be executed and prepare them for use later in the processor. For example, front end units 710 may include a fetch unit 701, an instruction cache 703, and an instruction decoder 705. As seen, front end units 710 may further include an ISA microcode store 706 that stores processor instructions of an ISA of the processor. In addition, a separate hidden microcode store 708 can store processor instructions for the hidden execution environment. Fetch unit 701 may fetch macro-instructions, e.g., from memory or instruction cache 703, and feed them to instruction decoder 705 to decode them into primitives, i.e., micro-operations for execution by the processor.

Referring still to FIG. 10, coupled between front end units 710 and execution units 720 is an out-of-order (OOO) engine 715 that may be used to receive the micro-instructions and prepare them for execution. More specifically OOO engine 715 may include various buffers to re-order micro-instruction flow and allocate various resources needed for execution, as well as to provide renaming of logical registers onto storage locations within various register files such as a register file 730 and a vector register file 735. Register file 730 may include separate register files for integer and floating point operations. Vector register file 735 may provide storage for vector-sized units, e.g., 256 or 512 bits per register. Additional storages such as an extend register 725 and a non-volatile storage 722 may be present. As described above, extend register 725 may be used to store information for use during attestation operations in a hidden execution environment. Among other information, non-volatile storage 722 may store private keys and processor identifiers including, e.g., a EPID and an OwnerID.

Various resources may be present in execution units 720, including, for example, various integer, floating point, and single instruction multiple data (SIMD) logic units, among other specialized hardware, such as an encryption accelerator. Results may be provided to retirement logic, namely a reorder buffer (ROB) 740. More specifically, ROB 740 may include various arrays and logic to receive information associated with instructions that are executed. This information is then examined by ROB 740 to determine whether the instructions can be validly retired and result data committed to the architectural state of the processor, or whether one or more exceptions occurred that prevent a proper retirement of the instructions. Of course, ROB 740 may handle other operations associated with retirement.

As shown in FIG. 10, ROB 740 is coupled to a cache 750 which, in one embodiment may be a low level cache (e.g., an 1 cache) although the scope of the present invention is not limited in this regard. Also, execution units 720 can be directly coupled to cache 750. From cache 750, data communication may occur with higher level caches, system memory and so forth. While shown with this high level in the embodiment of FIG. 10, understand the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An article comprising a machine-accessible storage medium including instructions that when executed cause a system to:
    receive an attestation request and a nonce from a verifier to attest to a hidden environment of the system executed using a hidden resource manager (HRM) implemented in microcode of a processor, wherein the hidden environment is not visible to system software;
    generate a signed attestation record responsive to the attestation request directly in the processor via the microcode and without communication with an agent coupled to the processor via an interconnect; and
    provide the signed attestation record to the verifier.

2. The article of claim 1, further comprising instructions to receive the attestation request in a kernel of the hidden environment and access a launch history of an application associated with the attestation request, hash the launch history and provide the nonce and the hashed launch history to the HRM.

3. The article of claim 2, further comprising instructions to generate, using the HRM, the attestation record including an owner identifier of the system, the owner identifier created by an owner of the system, a measurement of a launch control policy, a measurement of at least one kernel of the hidden environment, and to sign the attestation record with a private key.

4. The article of claim 3, further comprising instructions to transmit the signed attestation record to the verifier and verify the signed attestation record using a public key corresponding to the private key.

5. The article of claim 4, further comprising instructions to verify the signed attestation record by comparison of the nonce stored in the signed attestation record to the nonce provided by the verifier, and determine whether the application is included in a white list of applications.

6. The article of claim 1, further comprising instructions to:
    launch the hidden environment via execution of the microcode;
    verify a first kernel based on a first manifest for the first kernel using the microcode and if the first kernel is verified, update an extend register of the processor with a measurement of the first kernel; and verify a second kernel based on a second manifest for the second kernel using the microcode and if the second kernel is verified, update the extend register with a measurement of the second kernel.

7. A method comprising:
generating a cipher message authentication code (CMAC) of a plurality of pages of a hidden partition of a system memory of a system using a first private key and storing each of the CMACs in a corresponding entry of an integrity check value (ICV) array;
encrypting the first private key and a value of a counter into an encrypted blob using a second private key;
transitioning the system from a first power state to a low power state in which the system memory is unprotected by a processor of the system; and
using the encrypted blob and the ICV array to validate the hidden partition when the system is transitioned from the low power state to the first power state.

8. The method of claim 7, wherein the second private key is derived from a storage key by microcode of the processor executing in a hidden environment.

9. The method of claim 7, further comprising generating a CMAC of the ICV array using the first private key and storing the CMAC of the ICV array in a second storage.

10. The method of claim 7, further comprising storing the counter value in a persistent memory before transitioning the system into the low power state, and incrementing the stored counter value after return from the low power state, wherein the system memory is in a self-refresh mode when the processor is in the low power state.

11. The method of claim 7, further comprising incrementing the counter value and storing the incremented counter value in a non-volatile storage before transitioning the system into the low power state.

12. The method of claim 11, wherein validating the hidden partition includes:
decrypting the encrypted blob using the second private key, wherein the second private key is generated by microcode of the processor, to obtain the first private key and the counter value;
comparing the counter value to the incremented counter value stored in the non-volatile storage; and
verifying the CMAC of the ICV array and the CMAC of the pages.

13. The method of claim 12, further comprising indicating a failure of the validation if the comparison results in a difference greater than a predetermined threshold.

14. The method of claim 12, further comprising indicating a failure of the validation if a calculated CMAC for the ICV array does not match a stored CMAC value of the ICV array or a calculated CMAC for at least one of the pages does not match the corresponding CMAC stored in the ICV array.

15. A system comprising:
a processor to execute instructions, the processor including at least one core and a microcode storage including processor instructions to create and execute a hidden resource manager (HRM) to execute in a hidden environment that is not visible to system software, wherein the HRM is to receive an attestation request and a nonce from a verifier to attest to the hidden environment, generate a signed attestation record responsive to the attestation request in the processor without communication with an agent coupled to the processor via an interconnect, and provide the signed attestation record to the verifier; and
a system memory coupled to the processor and including a hidden memory partition.

16. The system of claim 15, wherein the system memory is to be in a self-refresh state when the processor is in the low power state.

17. The system of claim 15, wherein the HRM is further to receive the attestation request in a kernel of the hidden environment and access a launch history of an application associated with the attestation request, hash the launch history and provide the nonce and the hashed launch history to the HRM.

18. The system of claim 17, wherein the attestation record includes an owner identifier of the system, the owner identifier created by an owner of the system, a measurement of a launch control policy, a measurement of at least one kernel of the hidden environment, the attestation record signed with a private key, and the HRM is to transmit the signed attestation record to the verifier and verify the signed attestation record using a public key corresponding to the private key.

19. The system of claim 15, wherein the HRM is further to verify the signed attestation record by comparison of the nonce stored in the signed attestation record to the nonce provided by the verifier, and determine whether the application is included in a white list of applications.

20. The system of claim 15, wherein the HRM is further to verify a first kernel based on a first manifest for the first kernel, and if the first kernel is verified update an extend register of the processor with a measurement of the first kernel, verify a second kernel based on a second manifest for the second kernel, and if the second kernel is verified update the extend register with a measurement of the second kernel.

* * * * *